United States Patent
Michiyama et al.

(10) Patent No.: US 7,759,819 B2
(45) Date of Patent: Jul. 20, 2010

(54) ILLUMINATION CONTROL DEVICE FOR VEHICLE

(75) Inventors: Katsunori Michiyama, Toyota (JP); Atsushi Yamamoto, Nagoya (JP)

(73) Assignee: Denso Corporation, Kariya (JP)

( * ) Notice: Subject to any disclaimer, the term of this patent is extended or adjusted under 35 U.S.C. 154(b) by 282 days.

(21) Appl. No.: 11/902,676

(22) Filed: Sep. 25, 2007

(65) Prior Publication Data

US 2008/0100139 A1    May 1, 2008

(30) Foreign Application Priority Data

Nov. 1, 2006    (JP) .............................. 2006-297947

(51) Int. Cl.
  *B60L 1/14*    (2006.01)
  *B60Q 1/26*    (2006.01)
  *H01H 9/00*    (2006.01)
(52) U.S. Cl. ...................... 307/10.8; 340/469; 362/464; 362/465; 362/466; 200/61.54
(58) Field of Classification Search ................ 307/10.8; 340/468, 469; 362/394, 464, 465, 466, 507, 362/538; 200/61.54
See application file for complete search history.

(56) References Cited

U.S. PATENT DOCUMENTS

| | | | | |
|---|---|---|---|---|
| 6,014,207 A | * | 1/2000 | Suzuki et al. | 356/229 |
| 6,781,072 B2 | * | 8/2004 | Uchiyama et al. | 200/61.54 |
| 7,429,825 B2 | * | 9/2008 | Kubota et al. | 315/82 |
| 2005/0039969 A1 | * | 2/2005 | Laukkanen | 180/333 |

FOREIGN PATENT DOCUMENTS

| | | |
|---|---|---|
| JP | A-62-137242 | 6/1987 |
| JP | U-3-95532 | 9/1991 |
| JP | A-5-278518 | 10/1993 |
| JP | A-8-188085 | 7/1996 |
| JP | A-10-90055 | 4/1998 |

* cited by examiner

*Primary Examiner*—Jared J Fureman
*Assistant Examiner*—Hal I Kaplan
(74) *Attorney, Agent, or Firm*—Posz Law Group, PLC (57) ABSTRACT

An illumination control unit includes an automatic control function for automatically controlling the turning on and off of vehicle head lights depending on brightness of an environment around a vehicle. A sensitivity adjuster is installed on a lever extending from a steering column in a vehicle compartment. The sensitivity to the brightness of the environment around the vehicle at the time when the auto-on and auto-off state of the vehicle lights is changed can be adjusted with the sensitivity adjuster.

8 Claims, 9 Drawing Sheets

AUTO OFF
(CANCELLATION OF AUTOMATIC MODE)

FIG. 4C

AUTO ON
(SETTING OF AUTOMATIC MODE)

AUTO OFF
(CANCELLATION OF AUTOMATIC MODE)

AUTO ON
(SETTING OF AUTOMATIC MODE)

AUTO OFF
(CANCELLATION OF
AUTOMATIC MODE)

FIG. 12C

AUTO ON
(SETTING OF
AUTOMATIC MODE)

AUTO OFF
(CANCELLATION OF
AUTOMATIC MODE)

AUTO ON
(SETTING OF
AUTOMATIC MODE)

ILLUMINATION CONTROL DEVICE FOR VEHICLE

CROSS REFERENCE TO RELATED APPLICATION

This application is based on and claims priority from Japanese Patent Application No. 2006-297947 filed on Nov. 1, 2006, the disclosure of which is incorporated herein by reference.

TECHNICAL FIELD

The present invention relates generally to illumination control device, and specifically to an illumination control device for a vehicle.

BACKGROUND

In a conventional vehicle headlight system in which headlights are automatically turned on and off, according to JP-A-05-278518, manual on/off operations are recorded on an IC card to adapt the on/off operations to a driver's senses. On/off operations are adjusted based on information stored on the IC card.

However, in the above method, when the driver forgets the IC card, such recorded data is not available. Also, when drivers are changed during travel, habits of two different drivers are recorded on the same IC card. As a result, the recorded operation data becomes different from that of the original driver.

A system that automatically controls the high beam mode and the low beam mode operation of head lights is known such as disclosed in JP-A-62-137242. A system in which an operation switch of the system is installed on a vehicle rear-view mirror is known. In this case, when an automatic mode is set or canceled during driving, it is necessary for a driver to temporarily divert his eyes toward the rear-view mirror while setting or canceling the automatic mode. Also, a vehicle high beam control system is known in which the operation sensitivity of the system can not be adjusted during driving, thereby placing the driver in a disadvantaged position.

SUMMARY

In view of the above-described problems, it is an object to provide an illumination control device for a vehicle including an automatic control function that is superior to similar conventional devices.

According to one exemplary embodiment, an illumination control unit for a vehicle including an automatic control function for controlling the turning on and off of vehicle lights depending on brightness of an environment around the vehicle includes a lever extending from a steering column and an adjuster installed on the lever for adjusting a sensitivity to the brightness of the environment around the vehicle to automatically control the turning on and off of the vehicle lights.

When a driver operates the adjuster, the sensitivity to the brightness of the environment around the vehicle to automatically control the turning on and off of the vehicle lights can be adjusted. As a result, such an illumination control device is superior in operability compared to conventional device.

Preferably, the illumination control unit for a vehicle further includes a changing switch for performing the setting and/or the cancellation of an automatic mode of the automatic control function. The changing switch is installed on the lever on which the adjuster is installed for ease of driver's operability.

Preferably, the changing switch is a push button installed on the tip of the lever.

Preferably, the vehicle illumination control unit further includes an automatic mode display device installed on the lever for displaying the state of a setting and/or a cancellation of the automatic mode of the automatic control function. Therefore, the driver can easily confirm the state of the automatic mode.

Preferably, a push button includes the automatic mode display device and performs the setting and/or the cancellation of the automatic mode for ease of driver's confirmation.

According to another exemplary embodiment, a vehicle illumination control unit including an automatic control function for controlling the high beam mode and the low beam mode of vehicle lights includes a lever extending from a steering column, and a changing switch installed on the lever for performing the setting and/or the cancellation of an automatic mode of the automatic control function.

When the driver operates the changing switch, the setting and/or the cancellation of the automatic mode of the automatic control function can be performed. As a result, such an illumination control device including an automatic control function is superior in operability compared to conventional devices.

According to another exemplary embodiment, a vehicle illumination control unit including an automatic control function for controlling the high beam mode and the low beam mode of vehicle lights includes a lever extending from a steering column and an adjuster installed on the lever for adjusting detection sensitivity to a front running vehicle and/or an oncoming vehicle to automatically control the high beam mode and the low beam mode of the vehicle lights.

When a driver operates the adjuster, the detection sensitivity to the front running vehicle and/or the oncoming vehicle at the time when the high beam mode and the low beam mode are changed can be adjusted. As a result, an illumination control device including automatic control function is superior in operability compared to conventional device.

Preferably, the changing switch is also for changing an automatic mode for turning on and off of vehicle lights depending on brightness of the environment around the vehicle and is also for simultaneously actuating for the automatic mode of the high beam and low beam mode and the vehicle lights.

Preferably, the vehicle illumination control unit includes an adjuster also installed on the lever for adjusting detection sensitivity to a front running vehicle and/or an oncoming vehicle at the time when the high beam mode and the low beam mode are changed by the automatic control function.

Preferably, the changing switch is a push button installed on the tip of the lever for ease of driver operation and including the automatic mode display device for ease of driver confirmation.

Preferably, the cancellation of an automatic mode is performed by manipulating the lever.

Preferably, the vehicle illumination control unit further includes an automatic mode display device installed on the lever for displaying the state of a setting and/or a cancellation of the automatic mode of the automatic control function. Therefore, the driver can confirm the state of the automatic mode.

BRIEF DESCRIPTION OF THE DRAWINGS

Other objects, features and advantages of various exemplary embodiments will become more apparent from the following detailed description made with reference to the accompanying drawings, in which.

DETAILED DESCRIPTION OF THE PREFERRED EMBODIMENTS

First Embodiment

Figure 1:
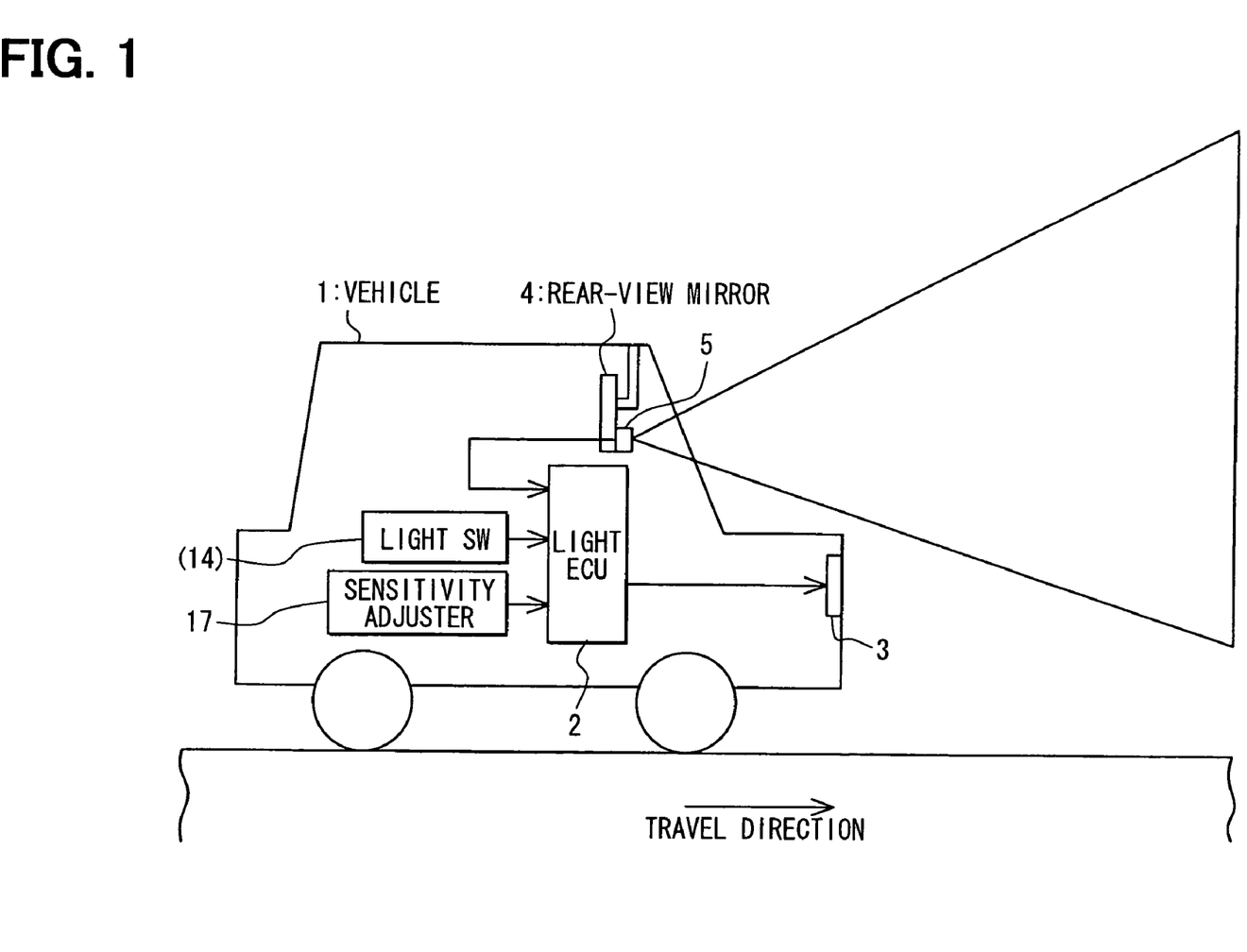
FIG. 1 is a diagrammatic view of an exemplary illumination control device.

A first exemplary embodiment is explained with reference to the figures. FIG. 1 is a diagrammatic view of an illumination control device for a vehicle. The illumination control device for a vehicle of this exemplary embodiment comprises an automatic control function (an automatic turning on and off system) to automatically control the turning on and off vehicle lights depending on the brightness of an environment, or ambient lighting, around a vehicle.

In FIG. 1, an electronic control unit (ECU) 2 for light control is installed on a vehicle 1. The ECU 2 is a device for controlling the turning on and off, or activation and de-activation, of vehicle lights such as head lights and preferably comprises a microcomputer.

A sensor (imaging device) 5 is installed on the back side of rear-view mirror 4 of vehicle 1. The sensor (imaging device) 5 picks up and detects ambient lighting around (forward in FIG. 1) the vehicle.

The sensor 5 is connected to the ECU 2. An output signal of the sensor 5 is transmitted to the ECU 2. The ECU 2 turns the vehicle lights on or off depending on the brightness of an environment, ambient lighting, based on the signal from the sensor 5. For example, at dusk, as the ambient lighting decreases, the ECU 2 turns on the vehicle lights. At dawn, as the ambient lighting increases, the ECU 2 turns off the vehicle lights.

Figure 2:
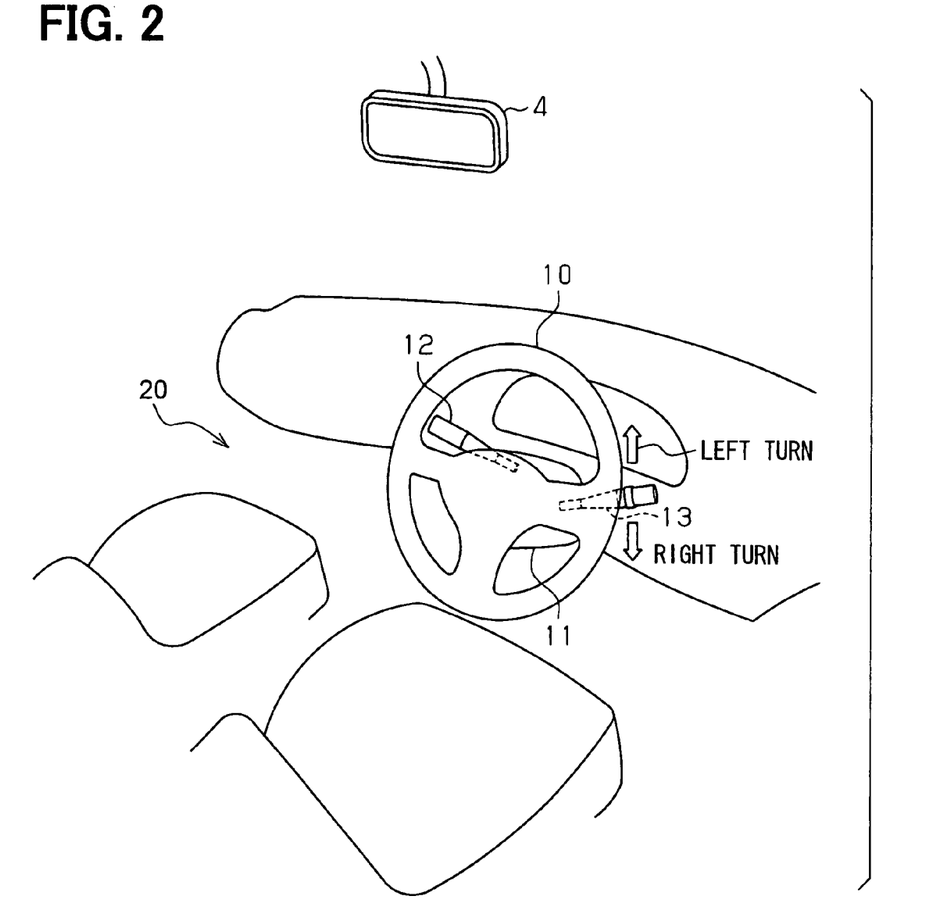
FIG. 2 is a perspective view showing an exemplary vehicle compartment.

FIG. 2 is a perspective view showing a vehicle compartment 20. A wiper switching lever (arm) 12 and a direction indicator lever (turn signal lever) 13 are installed on a steering column 11 of steering wheel 10 in the compartment 20. The wiper switching lever 12 is located on the left side of the steering column 11. A rotary wiper switch is installed on a tip of wiper switching lever 12. The direction indicator lever 13 is located on the right side of the steering column 11. The direction indicator lever 13, when manipulated in an upward direction activates the left turn light. The direction indicator lever 13, when manipulated in a downward direction, activates the left turn light.

Figure 3:
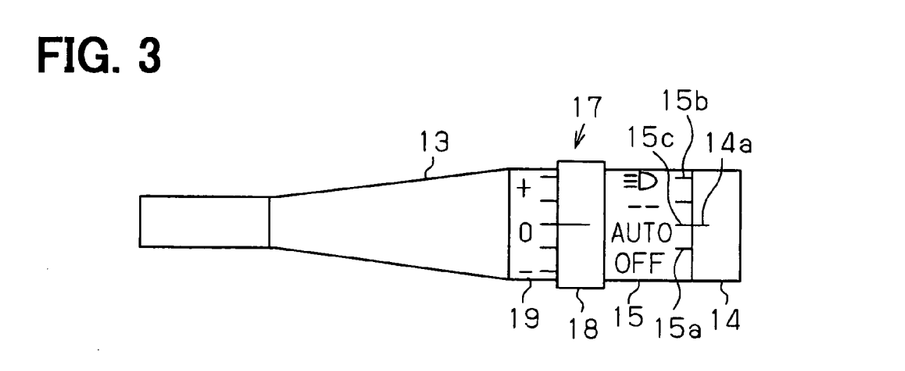
FIG. 3 is an enlarged side view of a direction indicator lever according to a first exemplary embodiment.

FIG. 3 is an enlarged side view of the direction indicator lever 13. A rotary light switch is installed on the tip of the direction indicator lever 13 in FIG. 3. The light switch comprises a movable ring 14 and a fixed member (column member) 15. Rotation of the movable ring 14 results in the following light control functions (i)-(iii). (i) The lights are turned off when a base line 14a of the movable ring 14 is rotated into alignment with an off-scale line 15a on fixed member 15. (ii) The lights are turned on when the base line 14a of the movable ring 14 is rotated into alignment with an on-scale line 15b on fixed member 15. (iii) An automatic light mode is set when the base line 14a of the movable ring 14 is rotated into alignment with an auto-scale line 15c on fixed member 15.

According to the operation of the light-off position described above in (i), tail lights and head lights can be turned off. According to the operation of the light-on position described above in (ii), the tail lights and the head lights can be turned on. According to the operation of the automatic light mode position described above in (iii), an automatic control system that automatically turns vehicle lights, such as head lights 3, on and off depending on the brightness of the environment around a vehicle can be turned on. In other words, an automatic mode can be set. A cancellation of the automatic mode can be performed by rotation of the movable ring to the light-off position described above in (i) or to light-on position described above in (ii).

An operation signal of a rotary light switch of FIG. 3 (an operation signal based on the rotation of the movable ring 14) is transmitted to the ECU 2 of FIG. 1.

A sensitivity adjuster (for sensitivity threshold adjustment) 17 is installed on the proximal end side of the fixed member 15 of the light switch of the direction indicator lever 13 in FIG. 3. The sensitivity adjuster 17 comprises a movable ring 18 and a fixed member (column member) 19. The sensitivity adjuster 17 can adjust light sensitivity (the threshold) of the sensor 5 by rotation of the movable ring 18. The sensitivity corresponds to a response to the brightness of the environment around the vehicle during the turning on and off of the vehicle lights. The sensitivity (the threshold) can be adjusted in a stepwise manner and can be held at any position that the driver operates.

Alternatively, the sensitivity may be adjusted in a continuous manner and may be held at any position that the driver operates. A sensitivity adjustment mechanism is configured as a mechanical contact signal output structure or a configuration in which resistance changes when the movable ring 18 rotates. The sensitivity adjustment may change in a stepwise manner or may change successively, and the movable ring 18 may click driving incremental adjustment or may rotate smoothly driving continuous adjustment.

An operation signal of the sensitivity adjuster 17 (an operation signal based on the rotation of the movable ring 18) of FIG. 3 is transmitted to the ECU 2 of FIG. 1. When the automatic mode is set, the ECU 2 compares the brightness of the environment around the vehicle based on signals from the sensor 5 with the threshold of the sensitivity adjuster 17. When the brightness of the environment around the vehicle is lower than the threshold, the ECU 2 turns on the vehicle lights. When the brightness of the environment around the vehicle is higher than the threshold, the ECU 2 turns off the vehicle lights such as the head lights.

As above mentioned, because the sensitivity adjuster 17 and the setting/cancellation switch of the automatic mode is installed on the direction indicator lever 13, the driver can operate by hand both the setting/cancellation operation of the automatic mode and the sensitivity adjustment. Therefore, a system with superior operability compared to conventional systems can be provided.

Regarding the sensitivity adjustment, for example, when the sensitivity is increased, the vehicle lights can be turned on at an earlier time at dusk. When the sensitivity is decreased, the vehicle lights can be turned on at a later time at dusk. Therefore, the driver can adjust the light sensitivity by operating the sensitivity adjuster 17.

Figure 4A:
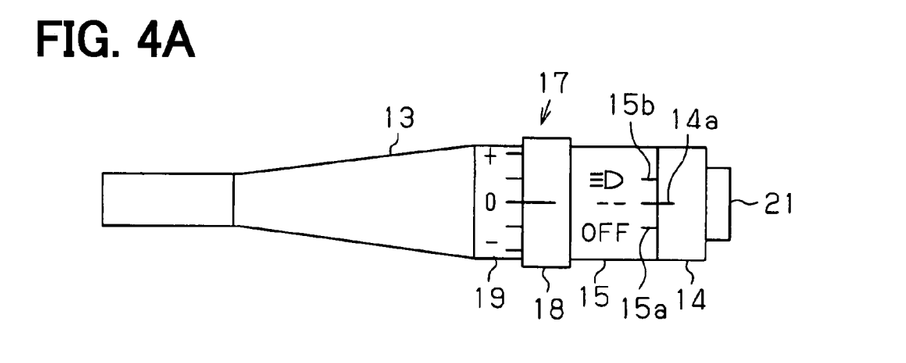
FIG. 4A is an enlarged side view of an alternative direction indicator lever according to the first exemplary embodiment.
Figure 4B:
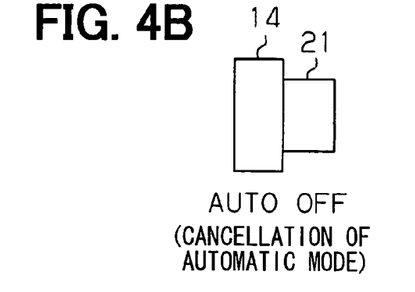
FIGS. 4B and 4C illustrate button operations for the direction indicator lever of FIG. 4A.
Figure 4C:
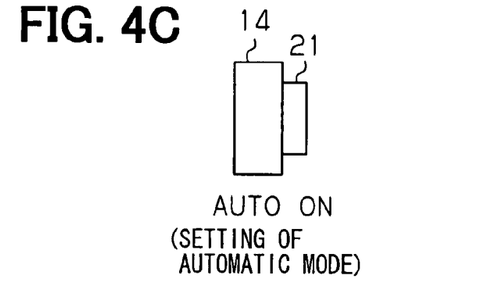

FIGS. 4A-4C illustrate an exemplary automatic mode adjustment configuration. The configuration may be adopted instead of that shown in FIG. 3. As shown in FIG. 4A, regarding the position of the automatic mode switch, the changing switch for setting (an auto-on state) of the automatic mode may be a push button 21 installed on the tip of the direction indicator lever 13. In FIGS. 4B and 4C, the state in which the button 21 protrudes indicates an auto-off state (the cancellation of the automatic mode). When the button is depressed from the auto-off state, the state changes to an auto-on state (the setting of the automatic mode). Thus, an automatic mode switch including an operation switch (push button 21) may be adopted.

Figure 5A:
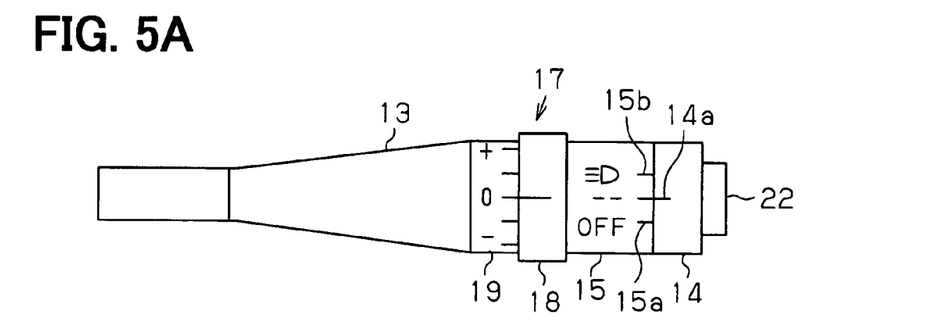
FIG. 5A is an enlarged side view of another alternative direction indicator lever according to the first exemplary embodiment.
Figure 5B:
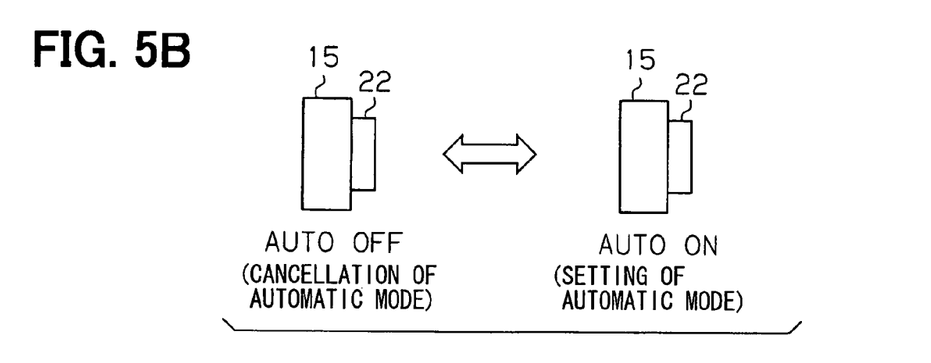
FIG. 5B illustrates button operations according to the direction indicator lever of FIG. 5A.

FIGS. 5A-5B illustrate an alternative of FIG. 3 of an automatic mode adjustment configuration. The configuration may be adopted instead of that shown in FIG. 3. As shown in FIG. 5A, the changing switch for setting (an auto-on state) of the automatic mode is a push button 22 installed on the tip of the direction indicator lever 13. As shown in FIG. 5B, each push of the button changes operation between the auto-off state (the cancellation of the automatic mode) and auto-on state (the setting of the automatic mode).

Figure 6:
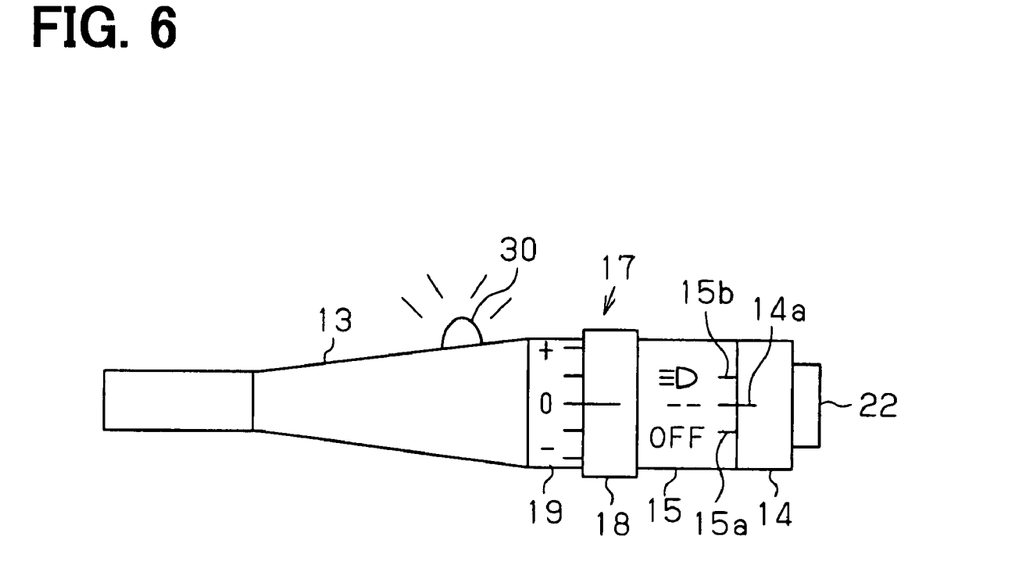
FIG. 6 is an enlarged side view of another alternative direction indicator lever according to the first exemplary embodiment.

FIG. 6 illustrates an alternative of the configuration in FIGS. 4A-4C and 5A-5B of an automatic mode adjustment configuration. The configuration may be adopted instead of that shown in FIGS. 4A-4C and 5A-5B. A display light 30 may be installed as an automatic mode display device for displaying an operating state of the system on the direction indicator lever 13. The display light 30 displays the state of the setting and the cancellation (auto-on and auto-off state) of the automatic mode. Specifically, the display light 30 is turned on when the automatic mode is set.

Figure 7:
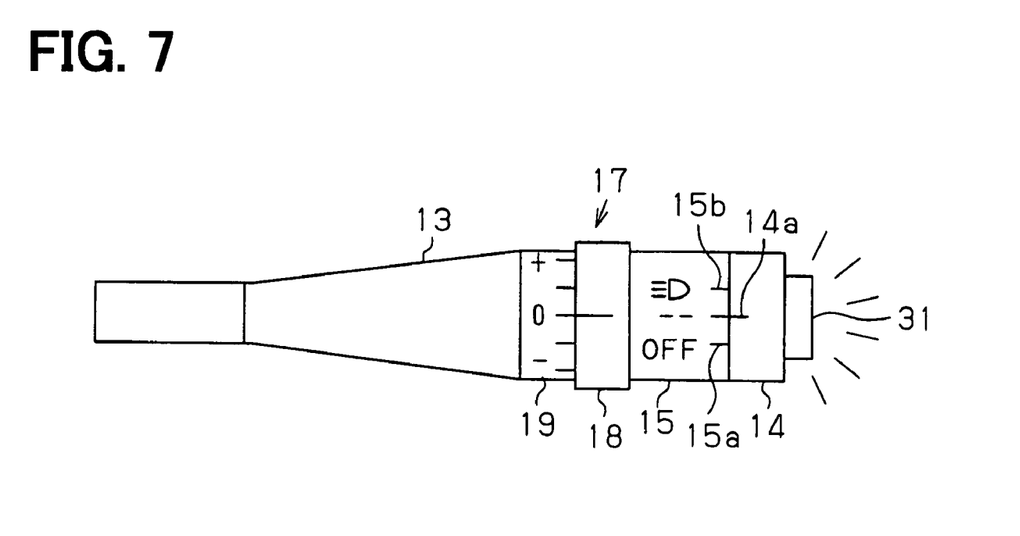
FIG. 7 is an enlarged side view of another alternative direction indicator lever according to the first exemplary embodiment.

FIG. 7 illustrates an alternative of FIG. 6 of an automatic mode adjustment configuration. The configuration may be adopted instead of that shown in FIG. 5. A push button 31 for setting the automatic mode may also function as the automatic mode display. In other words, the push button 31 for activating the setting (auto-on state) and/or the cancellation (auto-off state) of the automatic mode may be illuminated when the automatic mode is set.

In summary, according to the first exemplary embodiment, the following effects can be provided.

(1) As shown in FIG. 2 and FIG. 3, the sensitivity adjuster 17 for adjusting the sensitivity to the brightness of the environment around the vehicle at the time when the vehicle lights are selectively turned on or off by the automatic control function is installed on the direction indicator lever 13 that extends from the steering column 11 in the vehicle compartment 20. Therefore, the driver can adjust the system light sensitivity by operating this sensitivity adjuster 17. As a result, an illumination control unit for a vehicle having an automatic control function provides a superior system in operability compared to conventional system. Because the sensitivity adjuster 17 of the automatic light activation system is installed near the light switch of the direction indicator lever 13, the operability is superior compared to conventional systems.

(2) In (1) above, as shown in FIGS. 4A-4C and 5A-5B, the changing switch that performs the setting (auto-on state) and/or the cancellation (auto-off state) of the automatic mode is the push button 21, 22 installed on the tip of the direction instructor lever 13. Therefore, the setting operation of the automatic mode can be performed easily.

(3) In (1) or (2) above, as shown in FIGS. 6 and 7, the display light 30, 31 as an automatic mode display device for displaying the operational state of the automatic mode is installed on the direction indicator lever 13. Therefore, the driver can confirm the operational state of the automatic mode. In other words, ease of confirmation of system operation can be improved.

(4) In (3) above, as shown in FIG. 7, a push button 31 for the setting and/or the cancellation of the automatic mode is function as an automatic mode display device. Therefore, the driver can confirm more easily whether the automatic mode is activated.

A toggle switch operated by manipulating an operation lever, such as by pulling or pushing, may be adopted as the changing switch for the setting and the cancellation (auto-on and auto-off state) of the automatic mode.

Also, the wiper switching lever 12 of FIG. 2 may be implemented in the configurations discussed above in (1)-(4) instead of in the direction indicator lever 13.

Second Embodiment

A second exemplary embodiment will now be discussed.

An illumination control unit of a second exemplary embodiment comprises an automatic control function to automatically control high beam mode and low beam mode operation of the head lights 3 (an automatic high-low changing system).

A diagrammatic view of an illumination control device for a vehicle in the present exemplary embodiment is similar to FIG. 1. The illumination control device can pick up images ahead of the vehicle with a sensor (onboard color sensor in the present embodiment) 5. The sensor 5 is connected to the ECU 2. Image data picked up by sensor 5 is transmitted to the ECU 2. The ECU 2 performs various processes based on the image data. And, the ECU 2 can detect tail lights of a front running vehicle and head lights of an oncoming vehicle from the image data.

The ECU 2 of FIG. 1 can control the head lights 3. The ECU 2 controls operation of the head lights 3 in high beam mode or low beam mode based on whether a vehicle (the tail lights of the front running vehicle, the head lights of the oncoming vehicle) exists ahead.

Next, operation of an automatic high/low switching system which automatically controls the high beam mode and the low beam mode operation of head lights 3 is explained.

Figure 8:
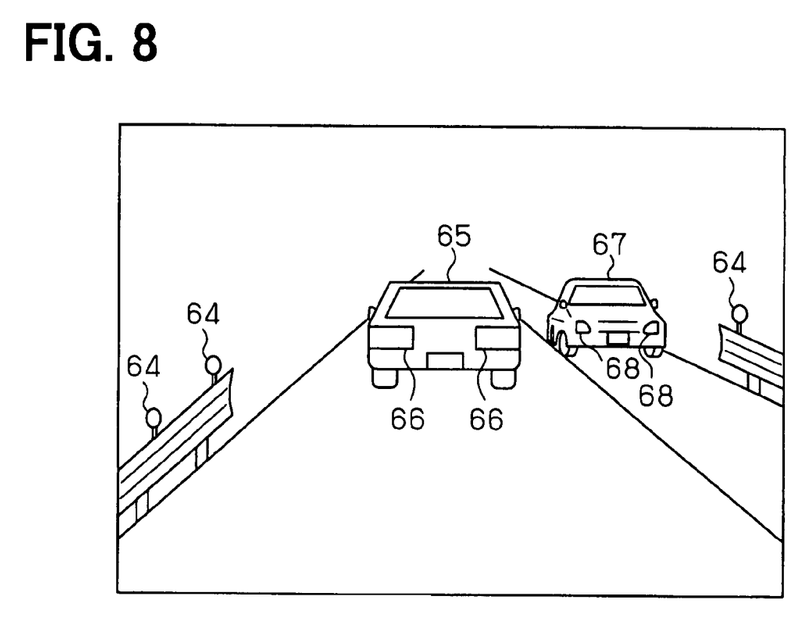
FIG. 8 is an imaging view of a forward direction of a vehicle according to a second exemplary embodiment.

As shown in FIG. 8, a vehicle runs on a road at night. A front running vehicle 65 and an oncoming vehicle 67 are present. Tail lights 66 and head lights 68 of the vehicles 66, 67 are turned on. The sensor (a onboard color sensor) 5 picks up the lights and the ECU 2 processes the data.

Figure 9:
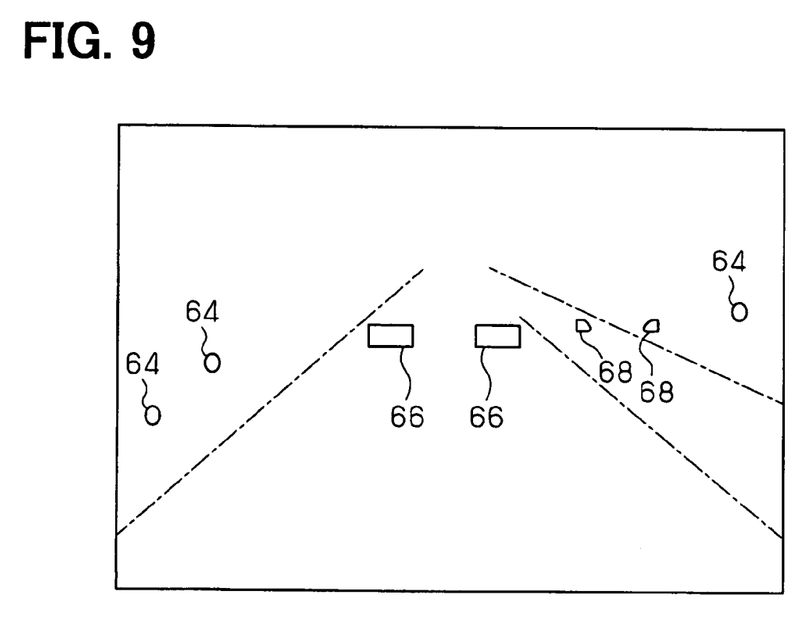
FIG. 9 is a view of the image shown in FIG. 8 after image processing according to the second exemplary embodiment.

As shown in FIG. 9, red lights are extracted with the sensor and the ECU 2. The tail lights 66 of the front running vehicle 65 can be detected by this extraction. Therefore, the ECU 2 can recognize the existence of the front running vehicle during night driving. In the same way, white lights are extracted, so the head lights 68 of the oncoming vehicle 67 can be detected by this extraction. Therefore, the ECU 2 can recognize the existence of the oncoming vehicle 67 during night driving. The ECU 2 controls the head lights 3 of the vehicle based on detection results of the tail lights 66 of the front running vehicle 65 and the head lights 68 of the oncoming vehicle 67. For example, when a vehicle (a front running vehicle or an oncoming vehicle) exists ahead of the vehicle at night, the ECU 2 switches the head lights 3 of the vehicle to low beam operation.

Figure 10:
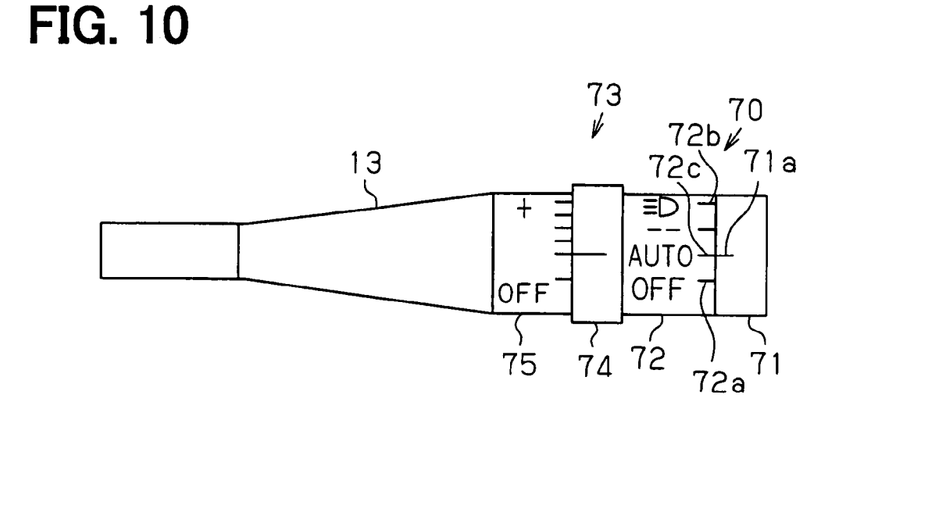
FIG. 10 is an enlarged side view of a direction indicator lever according to the second exemplary embodiment.

As shown in FIG. 10, a switch 70 is installed on the direction indicator lever 13 extended from the steering column 11 of FIG. 2. The switch 70 is a light switch and a switch for changing the setting and the cancellation (auto-on and auto-off state) of the automatic mode.

The switch 70 comprises a movable ring 71 and a fixed member (column member) 72. The following modes of operation (i)-(iii) can be set when a driver rotates the movable ring 71. (i) The lights are turned off when a base line 71a of the movable ring 71 is rotated into alignment with an off-scale line 72a on fixed member 72. (ii) The lights are turned on when the base line 71a of the movable ring 71 is rotated into alignment with an on-scale line 72b on fixed member 72. (iii) An automatic light beam mode is set when the base line 71a of the movable ring 71 is rotated into alignment with an auto-scale line 72c on fixed member 72.

According to the operation of the light-off position described above in (i), tail lights and head lights can be turned off. According to the operation of the light-on position described above in (ii), the tail lights and the head lights can be turned on. According to the operation of the automatic light beam mode position described above in (iii), an automatic mode (automatic high-low mode) can be set. The cancellation of the automatic mode can be performed by the operation of the light-off position described above in (i) or of the light-on position described above in (ii).

An operation signal of a rotary switch 70 of FIG. 10 (an operation signal based on the rotation of the movable ring 71) is transmitted to the ECU 2 of FIG. 1.

A sensitivity adjuster 73 is on the direction indicator lever 13 in FIG. 10. The sensitivity adjuster 73 comprises a movable ring 74 and a fixed member (column member) 75. The sensitivity adjuster 73 can adjust light detection sensitivity though rotation of the movable ring 74. The detection sensitivity indicates a response to the front running vehicle 65 and the oncoming vehicle 67 when the high beam mode and the low beam mode are changed. The sensitivity can be adjusted in a stepwise manner and can be held at any position that the driver operates.

According to the setting of the automatic light beam mode position of the switch 70, both the turning on and off of the vehicle lights and the changing between the high beam mode and the low beam mode are automatically performed. On the other hand, the sensitivity adjuster can be set to an off position that maintains the automatic mode of operation for the vehicle lights and cancels the automatic high-low mode for changing between the high beam mode of operation and the low beam mode of operation.

The sensitivity may also be adjusted in continuous manner and may be held at any position that the driver operates. A sensitivity adjustment mechanism may be configured by a mechanical contact signal output structure or a configuration in which resistance changes when the mechanism rotates. The sensitivity adjustment may change in a stepwise manner or may change continuously and may click driving incremental adjustment as the driver rotates it or may rotate smoothly driving continuous adjustment.

An operation signal of the sensitivity adjuster 73 (an operation signal based on the rotation of the movable ring 74) of FIG. 10 is transmitted to the ECU 2 of FIG. 1.

Figure 11:
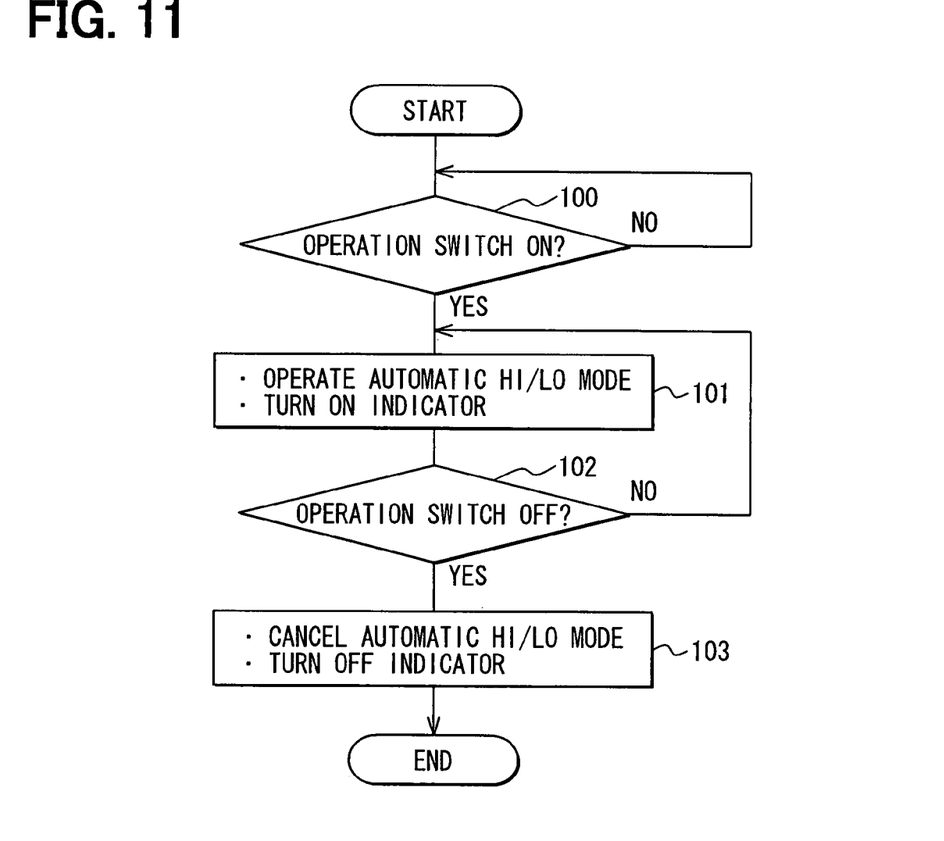
FIG. 11 is a flow diagram explaining operation of the illumination control device according to the second exemplary embodiment.

A specific operation of the automatic mode setting and cancellation by the ECU 2 is shown in FIG. 11. When the switch 70 is rotated to the automatic light beam position described above in (iii) at 100, it advances to 101, and the ECU 2 starts the operation of the automatic high-low mode and turns on an indicator. Subsequently, when the switch 70 is operated to the light-off position or the light-on position described above in (i) and (ii) at 102, it advances to 103, and the ECU 2 cancels the automatic high-low mode and turns off the indicator.

As above mentioned, because the sensitivity adjuster 73 and the setting/cancellation switch of the automatic mode is installed on the direction indicator lever 13, the driver can operate by hand both the setting/cancellation operation of the automatic mode and the sensitivity adjustment. Therefore, the illumination control unit can provide a superior system in operability compared to conventional systems.

Regarding the sensitivity adjustment, specifically, in FIGS. 8 and 9, when the sensitivity is increased up, the head lights of the oncoming vehicle and the tail lights of the front running vehicle can be detected far from the vehicle. However, it is possible that the lights from reflectors 64 are accidentally detected with the lights of the forward vehicle. On the other hand, when the sensitivity is decreased, accidental detection of the lights from reflectors 64 with the lights of the forward vehicle can be avoided. However, the detecting the head lights of the oncoming vehicle and the tail lights of the front running vehicle become difficult unless the vehicles approach the vehicle. Therefore, the driver can adjust the high beam mode and the low beam mode of operation to preferable levels by operating the sensitivity adjuster 73. Specifically, the sensitivity may be increased on a road with little traffic volume and decreased on a road inside a city.

Figure 12A:
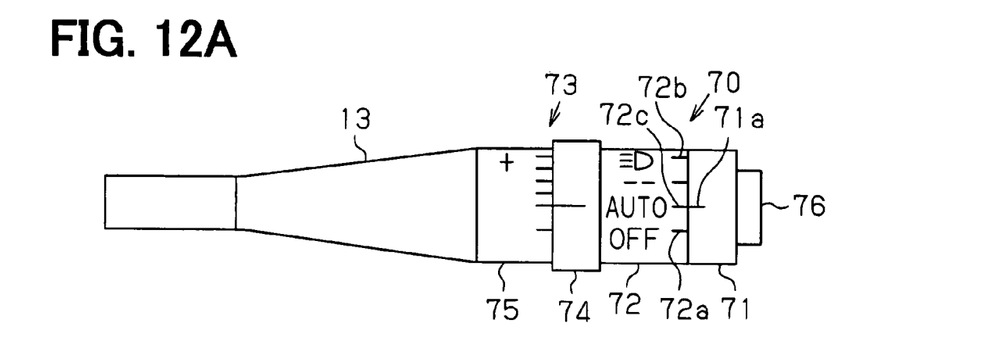
FIG. 12A is an enlarged side view of a direction indicator lever according to the second exemplary embodiment.
Figure 12B:
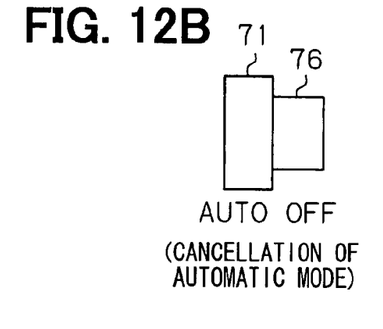
FIGS. 12B and 12C illustrate button operations according to the direction indicator levers of FIG. 12A.
Figure 12C:
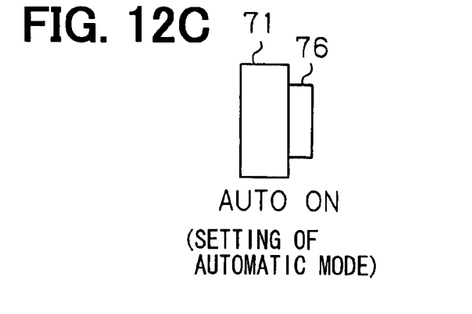

The configuration shown in FIGS. 12A-12C may alternatively be adopted instead of that shown in FIG. 10. As shown in FIG. 12A, regarding the position of the automatic mode switch, the changing switch for setting (auto-on state) of the automatic mode may be a push button 76 installed on the tip of the direction indicator lever 13. In FIGS. 12B and 12C, a state in which the button 76 protrudes indicates an auto-off (the cancellation of the automatic mode). When the button 76 is depressed from the auto-off state, the state changes to an auto-on state (the setting of the automatic mode). Thus, an automatic mode switch including an operation switch (push button 21) may be adopted.

Figure 13A:
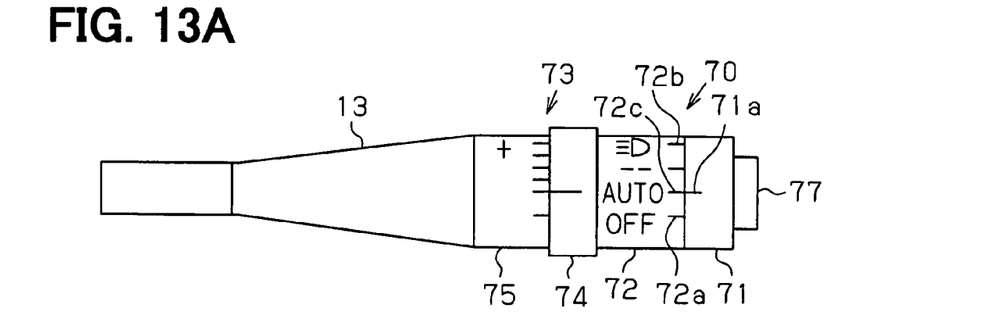
FIG. 13A is an enlarged side view of another alternative direction indicator lever according to the second exemplary embodiment.
Figure 13B:
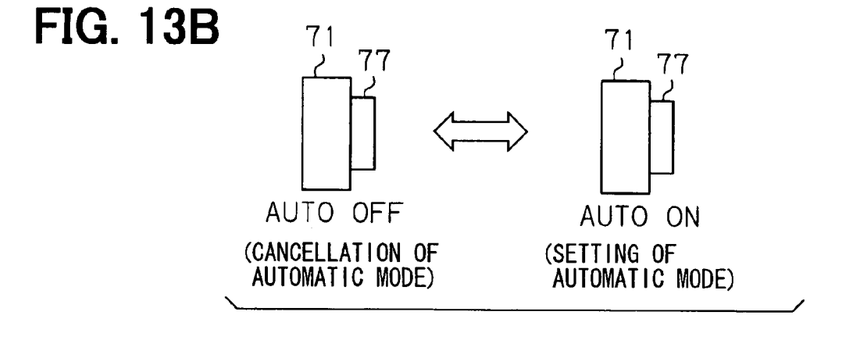
FIG. 13B illustrates button operations according to the direction indicator lever of FIG. 13A.

The configuration shown in FIGS. 13A and 13B may be adopted instead of that shown in FIG. 10. As shown in FIG. 13A, the changing switch for setting (auto-on state) of the automatic mode is a push button 77 installed on the tip of the direction indicator lever 13. As shown in FIG. 13B, each push of the button 77 changes operation between the auto-off state (the cancellation of the automatic mode) and the auto-on state (the setting of the automatic mode).

Figure 14:
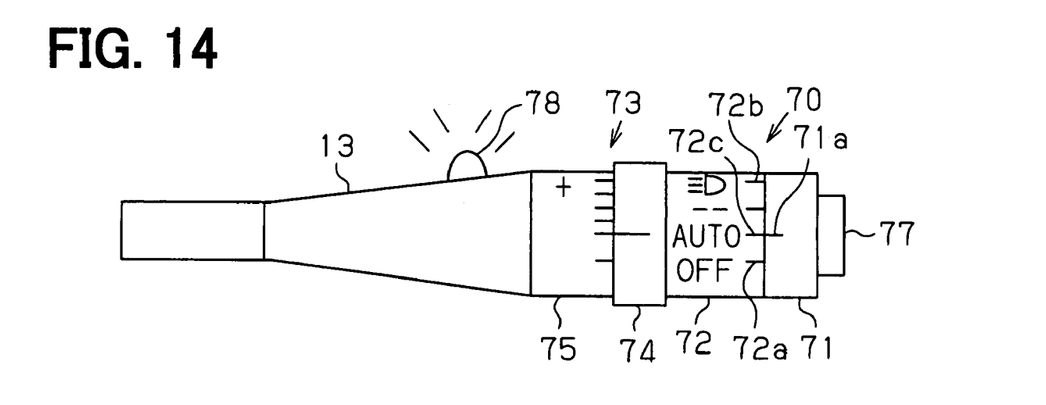
FIG. 14 is an enlarged side view of another alternative direction indicator lever according to the second exemplary embodiment.

The configuration shown in FIG. 14 may be adopted instead of that shown in FIGS. 12A-12C, 13A, and 13B. A display light 78 may be installed as an automatic mode display device for displaying an operating state of the system on the direction indicator lever 13. The display light 78 displays the state of the setting and the state of the automatic mode. Specifically, the display light 78 is turned on when the automatic mode is set.

Figure 15:
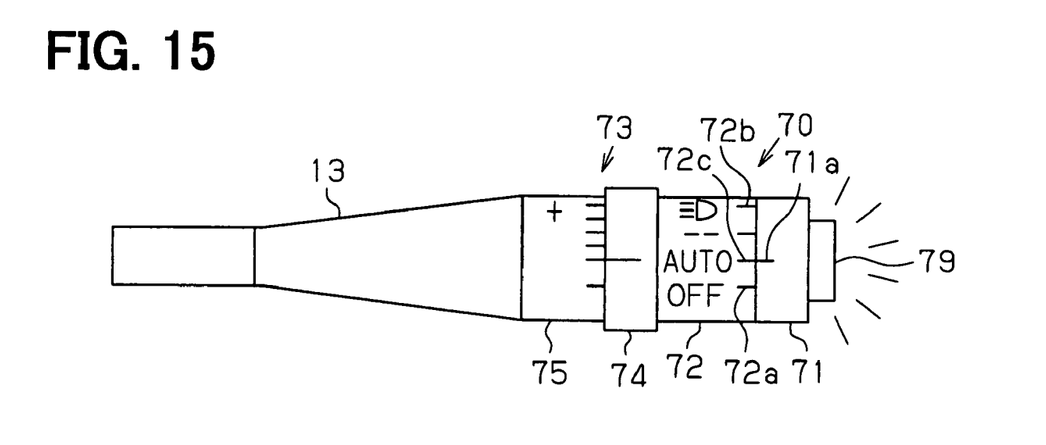
FIG. 15 is an enlarged side view of another alternative direction indicator lever according to the second exemplary embodiment.

The configuration shown in FIG. 15 may be adopted instead of that shown in FIG. 14. A push button 79 for setting the automatic mode may also function as the automatic mode display. In other words, the push button 79 for performing the setting (auto-on state) and/or the cancellation (auto-off state) of the automatic mode may be turned on. Specifically, the push button 79 is illuminated when the automatic mode is set.

Figure 16A:
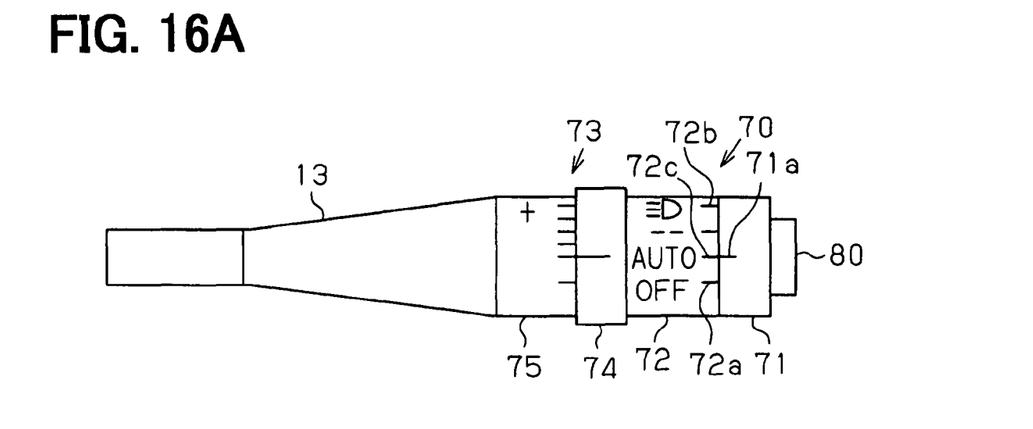
FIG. 16A is an enlarged side view of another alternative direction indicator lever according to the second exemplary embodiment.
Figure 16B:
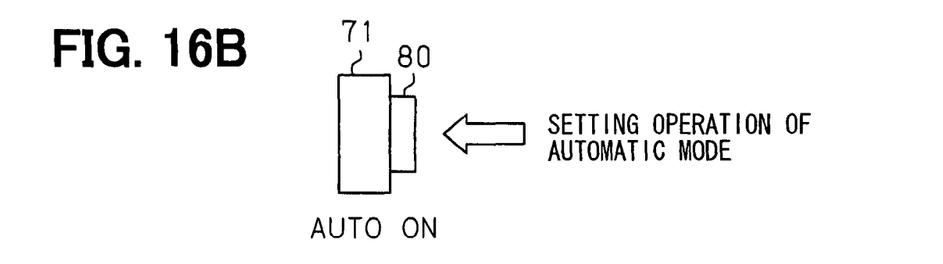
FIG. 16B illustrates button operation according to the direction indicator lever of FIG. 16A.

As shown in FIGS. 16A and 16B, the setting operation of the automatic mode may be performed by a push button 80 (when the button 80 is pushed once, automatic mode is performed). As shown FIG. 17, the driver may cancel the automatic mode by manipulating the direction indicator lever 13, for example by pulling or pushing. Thus, the direction indicator lever 13 may be used as a changing means of the automatic mode cancellation.

In summary, according to the second exemplary embodiment, the following effects can be provided.

(5) As shown in FIG. 2 and FIG. 10, the switch 70 for setting and/or the cancellation of the automatic mode of the automatic control function is installed on the direction indicator lever 13 extended from the steering column 11 in the vehicle compartment 20. Therefore, the setting and/or the cancellation of the automatic mode can be performed by the driver by operating the switch 70. As a result, an illumination control unit having an automatic control function can provide a system with superior operability compared to conventional systems.

(6) As shown in FIG. 2 and FIG. 10, the sensitivity adjuster 73 for adjusting the light detection sensitivity to the front running vehicle or the oncoming vehicle at the time when the high beam mode and the low beam mode are changed in the automatic control function is installed on the direction indicator lever 13. Therefore, the detection sensitivity can be adjusted by operating the sensitivity adjuster 73 by the driver. As a result, an illumination control unit for a vehicle having an automatic control function can provide a system with superior operability compared to conventional systems.

Thus, it is considered that the light switch described above is located near the steering wheel 10 for ease of operation. Because the operation switch of the automatic high-low changing system is installed the light switch of the direction indicator lever 13 and the sensitivity adjuster 73 is installed near the switch, the ease of operability is superior to conventional systems.

(7) In (5) above, as shown in FIGS. 12A-12C, 13A and 13B, the changing switch that operates to perform the setting and/or the cancellation of the automatic mode is the push button 76,77 installed on the tip of the direction instructor lever 13. Therefore, the setting operation of the automatic mode can be performed easily.

Figure 17:
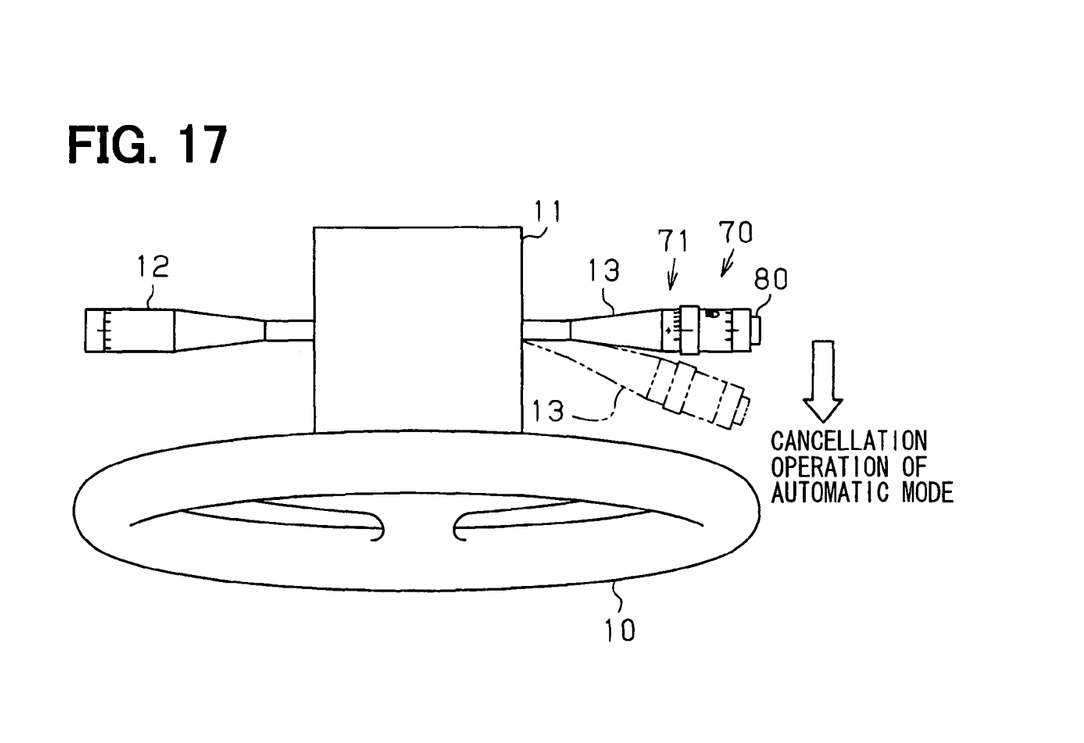
FIG. 17 is a plan view showing an installation location of a direction indicator lever according to the direction indicator lever of FIG. 16A.

(8) In (5) above, as shown in FIG. 17, the cancellation of the automatic mode is performed by manipulating the direction instructor lever 13, such as by pulling or pushing. Thus, the direction indicator lever 13 may be used as an operation lever for the automatic mode cancellation.

(9) In any of (5) to (8) above, as shown in FIGS. 14 and 15, the display light 78, 79 as an automatic mode display device for displaying the state of the setting and the cancellation (auto-on and auto-off state) of the automatic mode is installed on the direction indicator lever 13. Therefore, the driver can confirm the state of the setting or the cancellation of the automatic mode.

(10) In (9) above, as shown in FIG. 15, a push button 79 for the setting (auto-on state) and/or the cancellation (auto-off state) of the automatic mode is used as an automatic mode display device. Therefore, the driver can easily confirm the state of the automatic mode.

A toggle switch operated by falling down an operation lever may be adopted as the changing switch for the setting and the cancellation (auto-on and auto-off state) of the automatic mode.

The wiper switching lever 12 of FIG. 2 may be adapted to the configurations of (5)-(10) above instead of the direction indicator lever 13.

Such changes and modifications are to be understood as being within the scope of the present invention as defined by the appended claims.

What is claimed is:

1. An illumination control unit for a vehicle including an automatic control function for controlling a turning on and off of vehicle lights depending on brightness of an environment around the vehicle, comprising:
    a lever extending from a steering column; and
    an adjuster installed on the lever for adjusting sensitivity to the brightness of the environment around the vehicle to automatically control the turning on and off of the vehicle lights.

2. An illumination control unit for a vehicle according to claim 1, further comprising
    a changing switch also installed on the lever for performing the setting and/or the cancellation of an automatic mode of the automatic control function.

3. An illumination control unit for a vehicle according to claim 2, wherein the changing switch is a push button installed on the tip of the lever.

4. An illumination control unit for a vehicle according to claim 1, further comprising
an automatic mode display device installed on the lever for displaying the state of the automatic mode of the automatic control function.

5. An illumination control unit for a vehicle according to claim 4, further comprising:
a push button for performing the setting and/or the cancellation of the automatic mode; wherein
the push button also includes the automatic mode display device.

6. An illumination control unit for a vehicle including an automatic control function for controlling the high beam mode and the low beam mode of vehicle lights, comprising:
a lever extending from a steering column; and
an adjuster installed on the lever for adjusting detection sensitivity to a front running vehicle and/or an oncoming vehicle to automatically control the high beam mode and the low beam mode of the vehicle lights.

7. An illumination control unit for a vehicle including an automatic control function for controlling the high beam mode and the low beam mode of vehicle lights, comprising:
a lever extending from a steering column;
a changing switch installed on the lever for performing the setting and/or the cancellation of an automatic mode of the automatic control function; and
an adjuster also installed on the lever for adjusting detection sensitivity to a front running vehicle and/or an oncoming vehicle at the time when the high beam mode and the low beam mode are changed by the automatic control function.

8. An illumination control unit for a vehicle including an automatic control function for controlling the high beam mode and the low beam mode of vehicle lights, comprising:
a lever extending from a steering column;
a changing switch installed on the lever for performing the setting and/or the cancellation of an automatic mode of the automatic control function; and
an automatic mode display device installed on the lever for displaying the state of the automatic mode of the automatic control function, wherein
the changing switch is a push button; and
the push button includes the automatic mode display device.

* * * * *